US009596062B2

United States Patent
Koyanagi, I

(10) Patent No.: US 9,596,062 B2
(45) Date of Patent: *Mar. 14, 2017

(54) BASE STATION AND MOBILE STATION

(71) Applicant: NEC Corporation, Tokyo (JP)

(72) Inventor: Kenji Koyanagi, I, Tokyo (JP)

(73) Assignee: NEC Corporation, Tokyo (JP)

(*) Notice: Subject to any disclaimer, the term of this patent is extended or adjusted under 35 U.S.C. 154(b) by 122 days.

This patent is subject to a terminal disclaimer.

(21) Appl. No.: 14/543,175

(22) Filed: Nov. 17, 2014

(65) Prior Publication Data

US 2015/0071245 A1 Mar. 12, 2015

Related U.S. Application Data

(63) Continuation of application No. 13/343,732, filed on Jan. 5, 2012, now Pat. No. 8,923,242, which is a
(Continued)

(30) Foreign Application Priority Data

Jul. 28, 2004 (JP) .................................. 2004-220153

(51) Int. Cl.
*H04W 28/04* (2009.01)
*H04L 5/00* (2006.01)
(Continued)

(52) U.S. Cl.
CPC ............ *H04L 5/003* (2013.01); *H04L 5/0005* (2013.01); *H04L 5/0007* (2013.01);
(Continued)

(58) Field of Classification Search
CPC . H04W 80/04; H04W 80/7204; H04W 88/08; H04W 76/00; H04W 84/12;
(Continued)

(56) References Cited

U.S. PATENT DOCUMENTS 5,570,353 A 10/1996 Keskitalo et al.
5,603,096 A 2/1997 Gilhousen et al.
(Continued)

FOREIGN PATENT DOCUMENTS

DE 42 38 295 5/1994
EP 1180881 2/2002
(Continued)

OTHER PUBLICATIONS

The Extended European Search Report dated Jun. 27, 2011, Application No. 05767160.4.
(Continued)

*Primary Examiner* — Andrew Lee
(74) *Attorney, Agent, or Firm* — Young & Thompson

(57) ABSTRACT

In the present invention, a wireless transmission system includes a plurality of mobile stations in a cell area, and a base station. The base station divides each of an uplink frame and a downlink frame into a plurality of blocks, assigns a specific one of the plurality of blocks to each of the plurality of the mobile stations, assigns a specific frequency channel to the mobile station, and notifies the specific block and the specific frequency channel to the mobile station. The length of each of the plurality of blocks is optional, and a sum of the lengths of the plurality of blocks is equal to the length of the frame.

4 Claims, 14 Drawing Sheets

Related U.S. Application Data continuation of application No. 11/658,593, filed as application No. PCT/JP2005/013719 on Jul. 27, 2005, now Pat. No. 8,111,653.

(51) Int. Cl.
| | | |
|---|---|---|
| *H04L 5/14* | (2006.01) | |
| *H04W 16/30* | (2009.01) | |
| *H04W 72/08* | (2009.01) | |
| *H04W 16/02* | (2009.01) | |
| *H04W 24/02* | (2009.01) | |
| *H04W 88/08* | (2009.01) | |
| *H04W 28/24* | (2009.01) | |

(52) U.S. Cl.
CPC .......... *H04L 5/0037* (2013.01); *H04L 5/0058* (2013.01); *H04L 5/0091* (2013.01); *H04L 5/143* (2013.01); *H04W 16/02* (2013.01); *H04W 16/30* (2013.01); *H04W 24/02* (2013.01); *H04W 72/082* (2013.01); *H04W 88/08* (2013.01); *H04W 28/048* (2013.01); *H04W 28/24* (2013.01)

(58) Field of Classification Search
CPC ..... H04W 88/06; H04W 28/04; H04W 72/04; H04W 72/0446; H04B 7/2643
See application file for complete search history.

(56) References Cited

U.S. PATENT DOCUMENTS

| | | | |
|---|---|---|---|
| 5,615,215 | A | 3/1997 | Utting et al. |
| 5,657,343 | A | 8/1997 | Schilling |
| 5,737,704 | A | 4/1998 | Jin et al. |
| 5,758,090 | A | 5/1998 | Doner |
| 5,991,279 | A | 11/1999 | Haugli et al. |
| 6,049,535 | A | 4/2000 | Ozukturk et al. |
| 6,405,046 | B1 | 6/2002 | Kumaran et al. |
| 6,751,444 | B1 | 6/2004 | Meiyappan |
| 7,376,193 | B2 | 5/2008 | Lee et al. |
| 2002/0049537 | A1 | 4/2002 | Dooley et al. |
| 2002/0106003 | A1 | 8/2002 | Schilling |
| 2002/0137464 | A1 | 9/2002 | Dolgonos et al. |
| 2003/0123414 | A1 | 7/2003 | Tong et al. |
| 2003/0211831 | A1 | 11/2003 | Xu et al. |
| 2004/0097238 | A1* | 5/2004 | Hwang .................. H04L 5/023 455/447 |
| 2004/0166900 | A1* | 8/2004 | Qiu ....................... H04W 72/02 455/560 |
| 2004/0180658 | A1* | 9/2004 | Uchida ................ H04W 36/30 455/436 |
| 2004/0259565 | A1* | 12/2004 | Lucidarme ........... H04W 16/18 455/453 |
| 2006/0148411 | A1 | 7/2006 | Cho et al. |

FOREIGN PATENT DOCUMENTS

| | | |
|---|---|---|
| JP | 05-110499 | 4/1993 |
| JP | 07-162391 | 6/1995 |
| JP | 08-228375 | 9/1996 |
| JP | 10-93529 | 4/1998 |
| JP | 10-322759 | 12/1998 |
| JP | 2000-092560 | 3/2000 |
| JP | 2000-278734 | 10/2000 |
| JP | 2000-286787 | 10/2000 |
| JP | 2001-119743 | 4/2001 |
| JP | 2001-157249 | 6/2001 |
| JP | 2004-187257 | 7/2002 |
| JP | 2003-18077 | 1/2003 |
| JP | 2004-015697 | 1/2004 |
| JP | 2004-159345 | 6/2004 |
| KR | 2004-0041009 | 5/2004 |
| KR | 2004-55517 | 6/2004 |
| WO | 97/11571 | 3/1997 |

OTHER PUBLICATIONS

Korean Patent Office issued a Korean Office Action dated Jun. 1, 2009, Application No. 2009-7001816.

Agrawal, Dharma P., Zeng, Qing-An, "The Cellular Concept", College of Engineering & Applied Science, University of Cincinnati, 2002, p. 12.

Extended European Search Report issued Jun. 29, 2012 by the European Patent Office in European Patent Application No. 12151678.5, 6 pages.

* cited by examiner

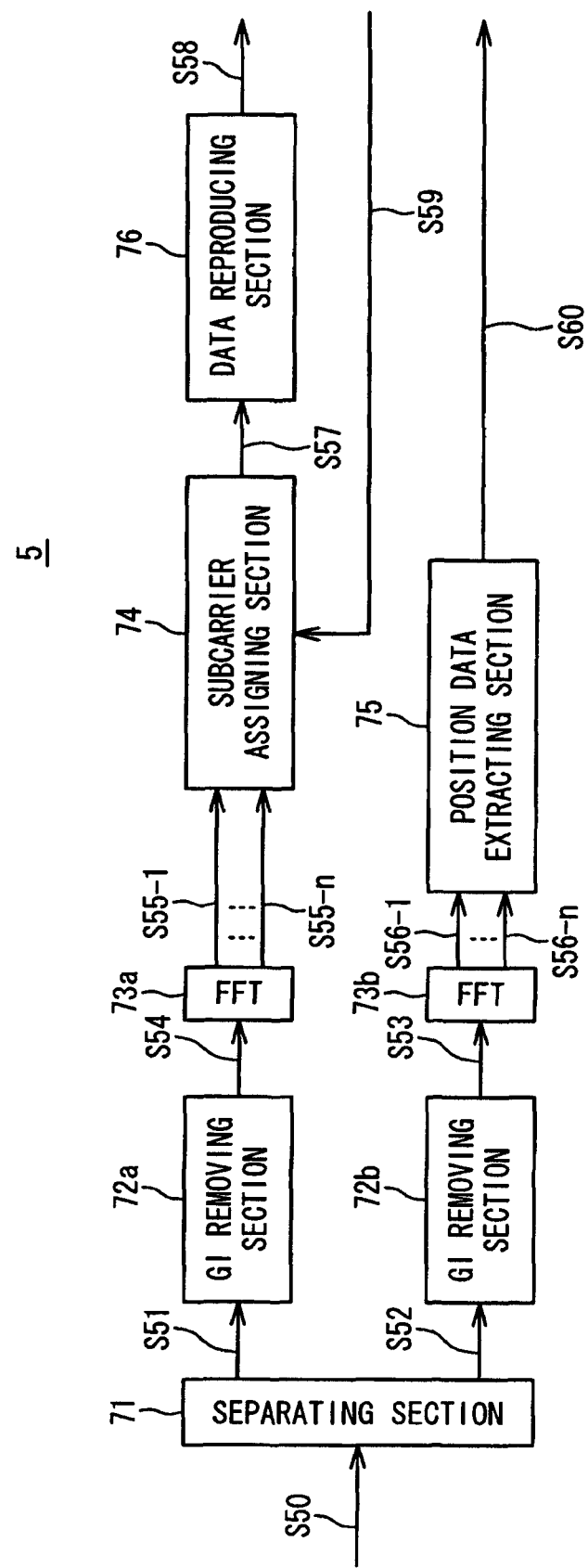

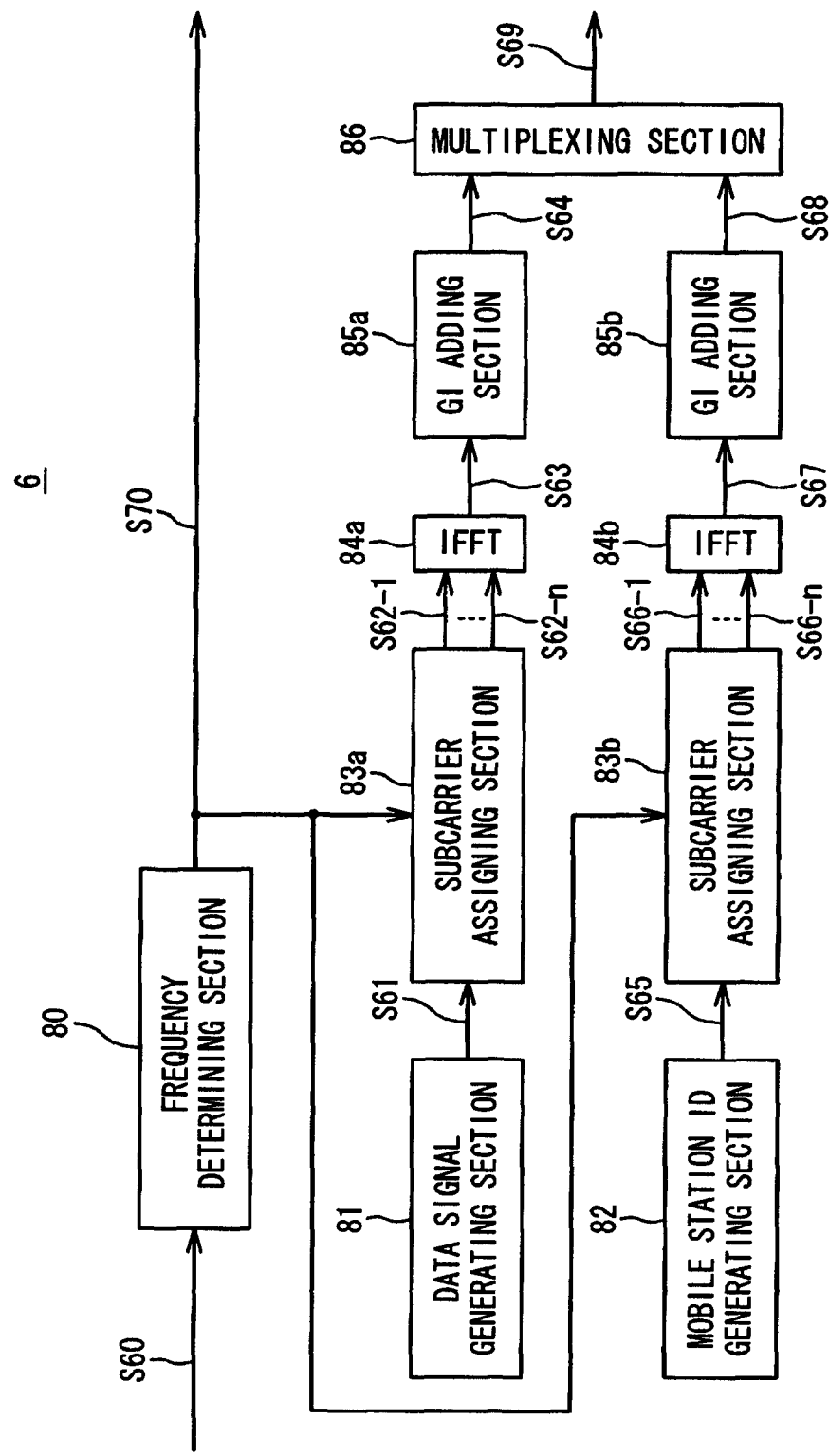

BASE STATION AND MOBILE STATION

TECHNICAL FIELD

The present invention relates to a wireless transmission system, particularly a wireless transmission system in which a base station is arranged to constitute a cell.

BACKGROUND ART

In a mobile communication system which is widely used at present, a service area as a communicable area for providing a service is divided into relatively small wireless zones that are called cells. In such a system, a plurality of base stations are arranged to cover the wireless zones, and a mobile station communicates with the plurality of the base stations by setting wireless frequency channels. If a same frequency channel is assigned to adjacent cells, interference between the cells is maximized in an end portion of the cell, so that the maximum throughput is greatly reduced, as compared with the center of the cell. Therefore, a conventional technique is known in which different frequency channels are used in the adjacent cells in order to prevent interference between the adjacent cells, as described in, for example, Japanese Laid Open Patent Application (JP-A-Heisei 10-93529: first conventional example).

FIG. 1 shows frequency channels to be assigned in the first conventional technique. As shown in FIG. 1, a base station is arranged in each of cells, and different frequency channels f1, f2 and f3 are assigned to the cells A, B and C respectively. Thus, by assigning the three frequency channels, or by repeatedly assigning different frequency channels over a frame, the distance between the cells causing interference from each other is elongated. Consequently, the maximum throughput can be improved in an end portion of the cell, compared with a case of using a single frequency channel.

However, if the different frequency channels are assigned to adjacent cells, a frequency utilization efficiency is greatly decreased in a center portion of the cell or around the base station, compared with a case of assigning the same frequency channel to the adjacent cells.

In conjunction with the above description, a wireless access system is disclosed in Japanese Laid Open Patent Application (JP-P2001-157249A). In the wireless access system of this conventional example, a service area as a whole is divided into cells, and a base station and a plurality of subscriber wireless stations for performing a point to multipoint communication by using the base station through wireless channels are arranged in each of the cells. An uplink wireless channel in a direction from the subscriber wireless station to the base station is composed of a wireless channel having a small capacity with more frequency repetition. A downlink wireless channel in a direction from the base station to the subscriber wireless station is composed of wireless channels having a larger capacity with less frequency repetition than the uplink wireless channel. Thus, a repetition frequency is asymmetrical between the uplink wireless channel and the downlink wireless channel. Therefore, while maintaining C/I of the uplink and downlink channels to be substantially equal, adaptability to a communication service in which the downlink channel requires a larger transmission capacity than the uplink channel can be maintained.

Also, there is a CDMA mobile communication system disclosed in Japanese Laid Open Patent Application (JP-P2001-119743A). This CDMA mobile communication system as this conventional example includes a plurality of base stations and mobile stations. A repetition period is equal to an information symbol period, and a short period spreading code commonly used in each of the base stations and the repetition period are longer than an information symbol, and the information symbol is spread in duplicate by using the short period spreading code and a long period spreading code which is different in each of the base stations. Synchronizing signals which have spread by the plurality of the base stations by using only the short period spreading codes are continuously transmitted. The synchronizing signal is transmitted from the plurality of the base stations at transmission timing which is shifted by a predetermined period of time for each base station. Therefore, loads of searching a peripheral cell and selecting the base station in the mobile station is decreased.

There is also a communication system disclosed in Japanese Laid Open Patent Application (JP-P2003-18077A). In this conventional example, a single zone is composed of a plurality of cells formed by a plurality of base stations, in which a zone control station connected to the plurality of the base stations controls communication with a mobile station in the zone. The base stations positioned first and last in the zone are base stations to communicate with the mobile station in two ways, and the remaining base stations in the zone are base stations to communicate with the mobile station in a one way. Therefore, improvement of a throughput is intended in case of performing a communication between the mobile station and the base station in a communication zone in which the cells are scattered.

Furthermore, there is a mobile communication system disclosed in Japanese Laid Open Patent Application (JP-P2004-15697A). According to this conventional example, the mobile communication system of a CDMA system or a W-CDMA system includes a mobile station, a base station having the plurality of carrier frequency large areas, and a wireless network control apparatus. The wireless network control apparatus includes a state measuring section, a call control processing section, and a frequency load distributing unit. The frequency load distributing unit includes a frequency converting unit for updating state data for each frequency and next assignment control data that were prepared in advance by referring to a frequency state change notice transmitted from the state measuring unit, and a frequency assignment control unit for returning a frequency assignment response by selecting a frequency referring to the next assignment control data updated in response to a frequency assignment request containing current processing information to be transmitted from the call control processing unit.

DISCLOSURE OF INVENTION

An object of the present invention is to provide a wireless transmission system which can prevent interference between cells and have a high frequency utilization efficiency in a cellular configuration.

According to an aspect of the present invention, the wireless transmission system includes a plurality of mobile stations and a base station existing in a cell area. The base station divides an uplink frame and a downlink frame into a plurality of blocks, assigns a specific one of the plurality of blocks to each of the plurality of mobile stations, assigns a specific frequency channel to each of the plurality of mobile stations, notifies the specific block and the specific frequency channel to each of the plurality of mobile stations.

The length of each of the plurality of blocks is optional, and a sum of the lengths of the plurality of blocks is equal to the length of the frame.

Here, the plurality of blocks correspond to a plurality of sub areas obtained by dividing the cell area, respectively. A single frequency channel of a plurality of frequency channels as the specific frequency channel is assigned to the mobile station assigned with one of the plurality of blocks which has the most interference from other cell areas. Any of the frequency channels as the specific frequency channel is assigned to the mobile station assigned with any of the plurality of blocks other than the one block.

Also, the uplink frame preferably has a same configuration as the downlink frame.

The base station may transmit an identifier of each of the plurality of mobile stations and a downlink data signal to each of the mobile stations by using the specific frequency channel of the specific block. The mobile station may detect the specific block and the specific frequency channel on the basis of the identifier.

Also, the base station may assign the specific block to the mobile station on the basis of a distance between the base station and the mobile station. In this case, the mobile station generates position data by measuring a position of the mobile station to transmit to the base station. The base station may determine the distance on the basis of the position data from the mobile station. Moreover, The mobile station may transmit a known pilot signal to the base station at a same timing, and the base station may receive the pilot signals from the plurality of mobile stations to generate a delay profile. The base station may determine the distance from the mobile station by the delay profile. Alternatively, the mobile station may measure a delay profile and transmits the measured delay profile to the base station. The base station may receive the delay profile from each of the plurality of mobile stations and determine the distance from the mobile station by using the received delay profiles.

Also, the base station may assign the specific block to the mobile station on the basis of an SIR as a ratio of signal power from the mobile station and interference power from other cells. In this case, the mobile station may transmit a known pilot signal to the base station, and the base station may receive the pilot signal from each of the plurality of mobile stations to measure the SIR of each of the mobile stations, and assign the specific block to the mobile station on the basis of the measured SIR. Alternatively, the mobile station may measure the SIR and transmit the measured SIR to the base station, and the base station may receive the SIR from each of the mobile stations to assign the specific block to the mobile station on the basis of the received SIRs.

The uplink frame and the downlink frame may be frequency-multiplexed, or the uplink frame and the downlink frame may be time-multiplexed.

The base station may determine the maximum number of mobile stations in each of the plurality of blocks, and if the number of the mobile stations assigned to the specific block exceeds the maximum number of mobile station number, may assign the mobile station assigned last to the specific block to one of the plurality of blocks other than the specific block. Also, the base station may determine the maximum number of mobile stations in each of the plurality of blocks, and if the number of mobile stations assigned to the specific block exceeds the maximum number of mobile stations, may assign the mobile station assigned last to the specific block to a downlink frame following to a current frame.

The base station may specify a subcarrier used by the base station in accordance with the specific frequency channel by using an OFDM (orthogonal frequency division multiplex) as a wireless transmission method. In this case, the y-th (Y=0, 1, . . . , W−1) frequency channel used in the specific block has (T/W) subcarriers. W is a frequency repetition number and T is an integer divisible by W. The (T/W) subcarriers may be in the (y+W*z)-th positions (z=0, 1, . . . , T/W) among a total T of subcarriers in one OFDM symbol. Also, the (T/W) subcarriers may be continuous subcarriers from the (T/W*y+1)-th subcarrier to the (T/W*(y+1))-th subcarrier among a total T of subcarriers in one OFDM symbol. Alternatively, the (T/W) subcarriers may be T/W subcarriers randomly selected among a total T of subcarriers in one OFDM symbol under a condition that overlapping with subcarriers used in other frequency channels is q (q=0, 1, . . . , T/W) or less.

BRIEF DESCRIPTION OF DRAWINGS

FIG. 15 is a block diagram showing the configuration of the receiving section in the base station side according to the second embodiment;

FIG. 16 is a block diagram showing the configuration of the transmitting section in the base station side according to the second embodiment;

BEST MODE FOR CARRYING OUT THE INVENTION

Hereinafter, a wireless transmission system according to the present invention will be described in detail with reference to the attached drawings.

First Embodiment

Figure 1:
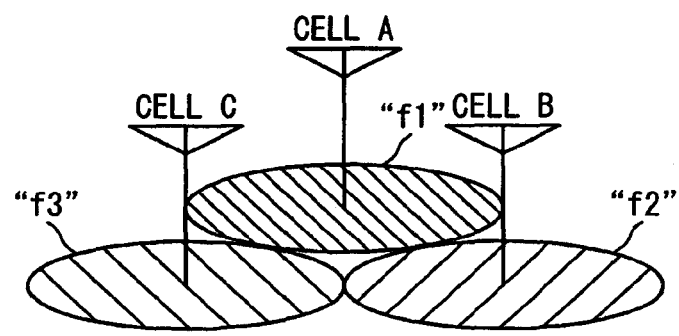
FIG. 1 is a block diagram showing the configuration of a conventional wireless transmission system.
Figure 2:
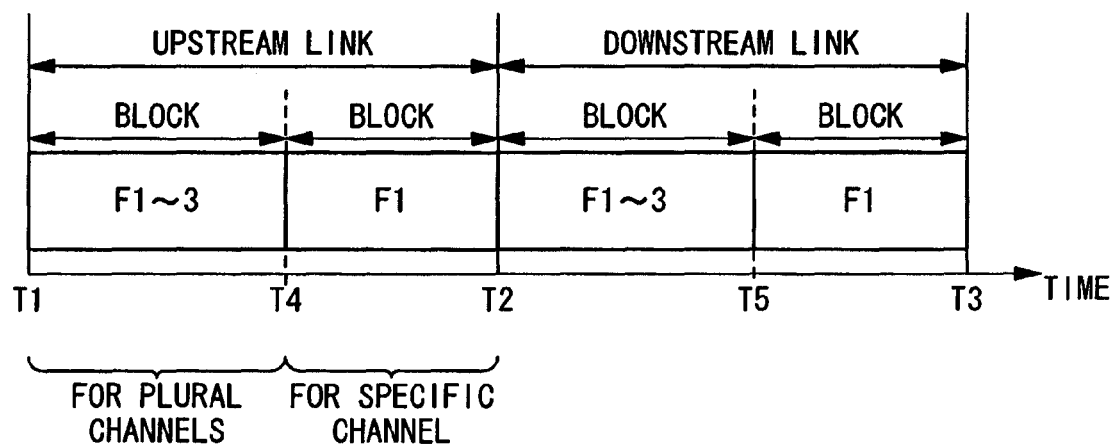
FIG. 2 is a diagram schematically showing the configuration of a communication data according to the present invention.
Figure 3A:
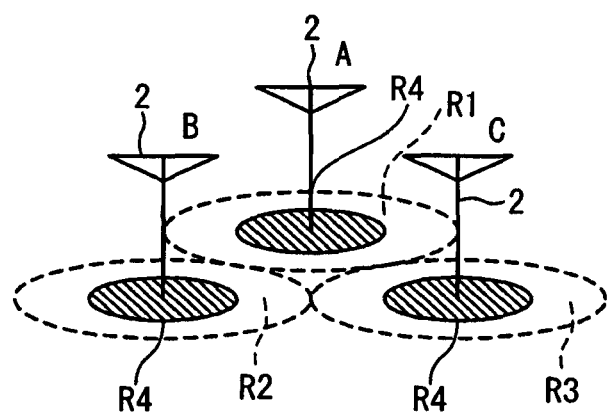
FIG. 3A is a diagram showing a center area of a cell.
Figure 3B:
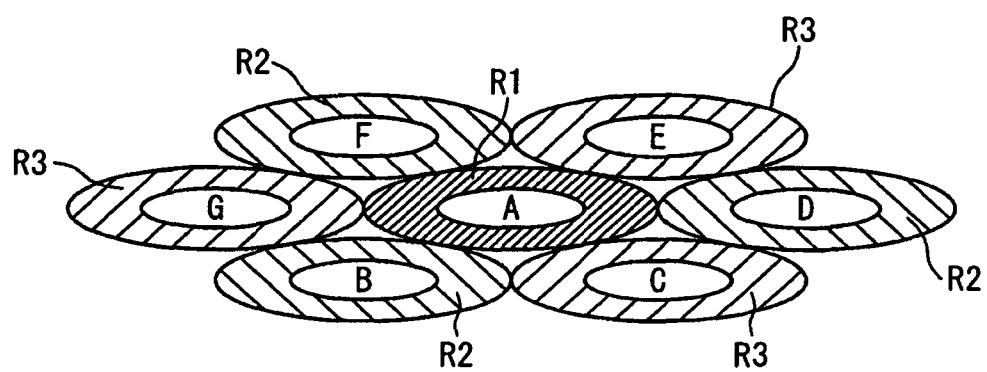
FIG. 3B is a diagram showing a peripheral area of the cell.

FIGS. 2, 3A and 3B are diagrams schematically showing assignment of frequency channels in the wireless transmission system according to the present invention. As shown in FIG. 2, in the wireless transmission system according to the present invention, an uplink is used for communication from the mobile station to the base station while a down link is used for communication from the base station to the mobile station. The uplink and the downlink are switched in a predetermined time interval for data transmission.

As shown in FIGS. 3A and 3B, the base station is arranged in the vicinity of the center of each of cell areas A to G. Each of the cell areas is divided into a plurality of areas. In examples shown in FIGS. 3A and 3B, each of the cell areas is divided into two areas. The area is divided based on blocks of the uplink frame and the downlink frame. The mobile station performs communication by using one of frequency channels assigned to the area in which the mobile station exists. In FIG. 3A, the center area of each of the cell areas A to C is set to an area R4, and peripheral areas thereof are set to areas R1, R2 and R3. Frequency channels f1, f2 and f3 are assigned to the areas R1, R2 and R3, respectively. All of the frequency channels f1, f2 and f3 are assigned to the area R4, so that the mobile station uses one of these frequency channels to communicate with the base station. Moreover, as shown in FIG. 3B, a peripheral area of the cell area A is set to the area R1, and peripheral areas as of the surrounding cell areas B to G are set to the areas R2, R3, R2, R3, R2 and R3, respectively. This is a same as the frequency assignment in a conventional example, and the number of frequency repetitions is three. The assignment of the areas, as described above, prevents interference between the cell areas. The assignment of the area R4 to center areas of the cell areas A to G makes frequency utilization efficiency to be improved. It should be noted that although each of the cell areas is divided into two in FIGS. 2, 3A and 3B, the cell area may be divided into more areas. Thus, it is possible to increase the number of the frequency channels to be assigned in a stepwise manner from the furthest area.

As described above, the uplink frame and the downlink frame are divided into a plurality of blocks, and these blocks correspond to the plurality of areas in each of the cell areas. Time of each of the blocks is optional and a total time in each of the blocks is equal to time in the link frame. The uplink frame and the downlink frame have a same block configuration.

Figure 4:
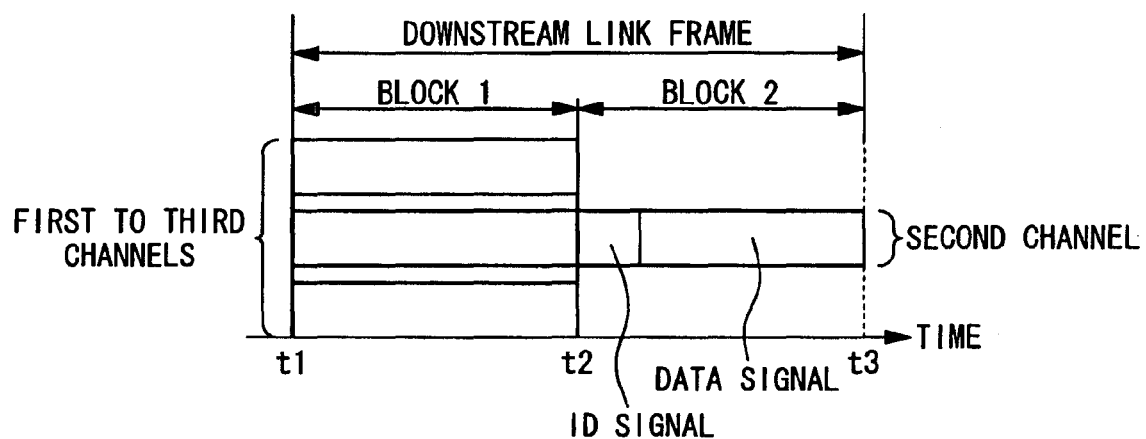
FIG. 4 is a diagram showing the configuration of downlink communication data according to the first embodiment.

The downlink frame shown in FIG. 4 has the frame configuration of the downlink in case of communicating to the mobile station in the area R2 of the cell area B. As shown in FIG. 4, the base station divides the frame into a first block from a time t1 to a time t2 and a second block from the time t2 and a time t3. Here, the base station assigns first to third frequency channels to the first block, and assigns a second frequency channel to the second block as a specific frequency channel.

The base station transmits an ID signal of the mobile station and a transmission data signal on the second frequency channel of the block 2 to the mobile station in the area R2 of the cell area B. If the frame is periodically used for transmission and reception in accordance with the elapse of time, the first block and the second block are periodically generated in synchronism with the frame period.

The mobile station checks the ID signal over all the frequency channels (f1 to f3) of all the blocks (block 1 and block 2) of a received multiplexed signal. Thereby, a frequency channel and a block number assigned to a mobile station in the downlink frame can be specified.

Figure 5:
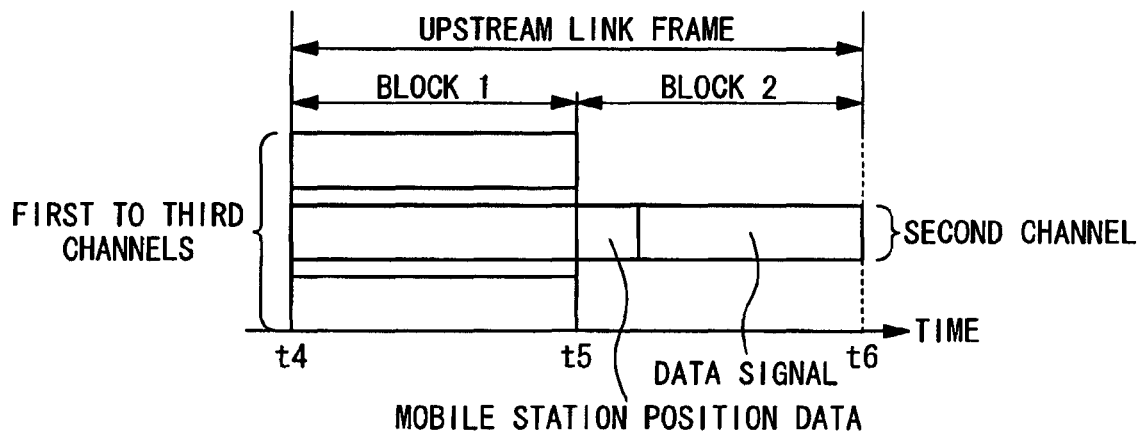
FIG. 5 is diagram showing the configuration of uplink communication data according to the first embodiment.

FIG. 5 shows the frame configuration of the uplink frame from the mobile station to the base station. As shown in FIG. 5, the mobile station in the area R2 of the cell area B obtains a position data and generates a data signal to which the position data has been added in a head area, to transmit to the base station by using the second frequency channel of the second block. In the present embodiment, it is assumed that the mobile station uses a same block number and a same frequency channel of the uplink frame as in the downlink. That is, the mobile station frequency-multiplexes a signal to a block and a frequency channel specified by assignment data in the uplink frame for transmission.

The position data of the mobile station is obtained by various methods. For example, the mobile station may incorporate a GPS measuring instrument which is used for generating the position data. If a plurality of the mobile stations exists in the cell area B, each of the mobile stations transmits a known pilot signal to the base station at the same timing. The base station receives the pilot signal from each of the mobile stations to generate a delay profile, and may determine the distance from each of the mobile stations by using the delay profile. Furthermore, a known pilot signal is transmitted to each of the mobile stations from a certain equipment or the base station, and each of the mobile stations receives the pilot signal to measure a delay profile. The mobile station transmits the measured delay profile to the base station. The base station may receive the delay profile from each of the mobile station, and determine the distance from each of the mobile station by using the received delay profile.

Also, the base station may assign a specific block to each of the mobile stations based on an SIR which is a ratio of signal power from each of the mobile stations to interference power from other cells. At this time, a specific frequency channel has been determined in advance. For example, each of the mobile stations transmits a known pilot signal to the base station. The base station receives the pilot signal from each of the mobile stations to measure the SIP in each of the mobile station, and the specific block may be assigned to each of the mobile stations on the basis of the measured SIR. Also, each of the mobile stations may measure the SIR and transmit the measured SIR to the base station. In this case, the base station receives the SIR from each of the mobile stations, and assigns the specific block to each of the mobile stations on the basis of the received SIR.

Thereafter, when the mobile station further moves and is confirmed to enter the area R4 of the cell area B, the block 1 is assigned and one of the first to third frequency channels (f1 to f3) is assigned. On the basis of the determination, a base station 2 generates a data signal to which an ID signal of the mobile station has been added in a head portion and performs communication by using the first block. Thus, the mobile station knows that the block 1 was assigned to its own station.

Figure 6:
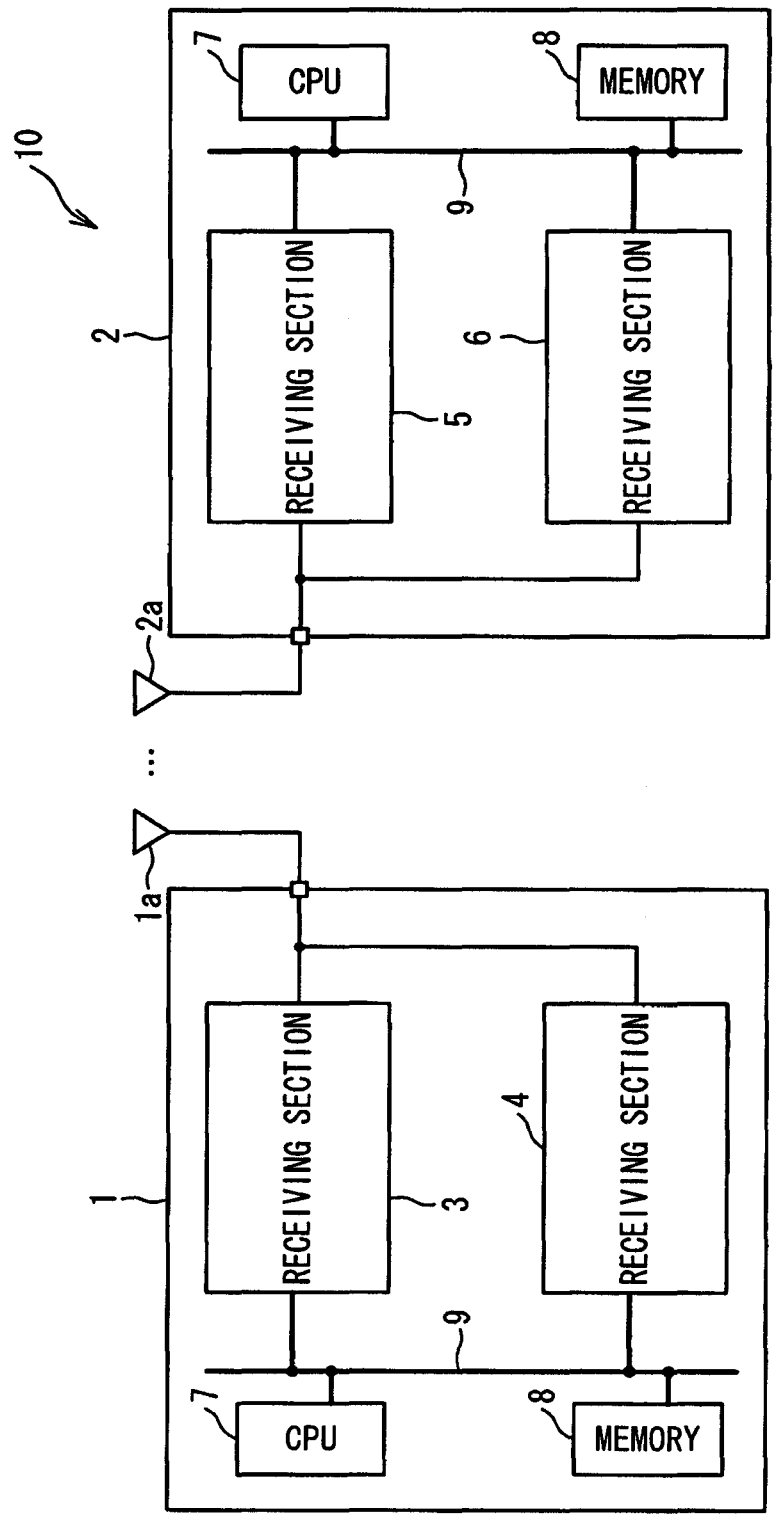
FIG. 6 is a block diagram showing the configuration of a wireless transmission system according to the first embodiment of the present invention.

FIG. 6 is a block diagram showing an example of the configuration between the base station and the mobile station in a wireless transmission system according to the first embodiment of the present invention. FIG. 6 shows a mobile station 1 and a base station 2 for easily understanding the present invention. However, the wireless transmission system 10 according to the present invention may be composed of a plurality of base stations and a plurality of mobile stations in the same manner as a typical mobile communication system. In this case, an ID is assigned to each of the stations and each of the stations identifies stations other than its own station by the IDs. As shown in FIG. 4, the mobile station 1 is provided with a mobile station antenna 1a. Similarly, the base station 2 is provided with a base station antenna 2a. Wireless communication is carried out between the mobile station 1 and the base station 2 via the mobile station antenna 1a and the base station antenna 2a. The wireless communication between the mobile station 1 and the base station 2 is performed in units of frames, that is, in a unit of a lamp of data of a specific amount. In the present embodiment, the uplink frame and the downlink frame are alternately multiplexed in terms of time. Each of the uplink frame and the downlink frame is divided into first to N (N is an integer of 2 or more) blocks, in which the length of each of the blocks is optional. The mobile station uses a same block number and a same frequency channel in the uplink frame and the downlink frame. That is, in the uplink frame, the mobile station multiplexes a data signal to a frequency channel specified by assignment data (to be described below) to transmit a block specified by the assignment data.

The mobile station 1 includes a receiving unit 3, a transmitting section 4, a CPU 7, and a memory 8 that are connected through a bus 9. However, the configuration is no limited to this, and even if another configuration may be employed, the present invention can be applicable. The CUP 7 is a central processing unit for controlling various sections provided in the mobile station 1. The CPU 7 performs an operation by interpreting the data signal received from the receiving section 3 or the transmitting section 4. The CPU 7 outputs the operation result to a predetermined device. The memory 8 provided in the mobile station 1 is a storage medium for storing data which the mobile station 1 transmits and receives through the mobile station antenna 1a. The memory 8 is a storage device such as a semiconductor storage device, a magnetic storage device and a hardware disc, to which a read access and a write access are carried out in response to an instruction received through the bus 9. The receiving section 3 is supplied with a wireless signal received by the mobile station 1 through the mobile station antenna 1a. The transmitting section 4 converts communication data such as voice data and text data into a wireless communicable form. The communication data is inputted via an input device (not shown) provided in the mobile station 1. For example, if a voice is inputted, an input device (not shown) generates the voice data on the basis of the inputted voice to supply for the transmitting section 4. Details of the configuration of the receiving section 3 and the transmitting section 4 will be described below.

The base station 2 is a fixed wireless station arranged in each of the cells in the wireless transmission system according to the present invention. As shown in FIG. 6, the base station 2 includes a receiving section 5, a transmitting section 6, a CPU 7 and a memory 8. However, the present invention is not limited to this configuration, and the present invention can be applied to another configuration. The CPU 7, the memory 8 and the bus 9 provided in the base station 2 have the same functions as those provided in the mobile station 1, thereby detailed description thereof will be omitted. A wireless signal received by the base station 2 through the base station antenna 2a is supplied to the receiving section 5. The receiving section 5 of the base station performs data processing on the basis of the received wireless signal. The transmitting section 6 outputs communication data supplied thereto in response to a transmission instruction. The outputted communication data is transmitted to a predetermined mobile station 1 through the base station antenna 2a. Details of the configuration of the receiving section 5 and the transmitting section 6 will be described below.

Figure 7:
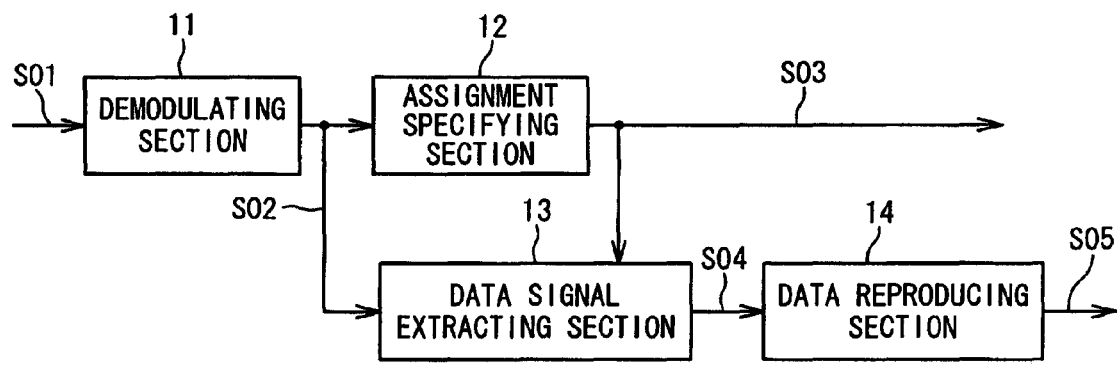
FIG. 7 is a block diagram showing the configuration of a receiving section in a mobile station according to the first embodiment.

FIG. 7 is a block diagram showing the configuration of the receiving section 3 in the mobile station 1 according to the first embodiment. As shown in FIG. 7, the receiving section 3 includes a demodulating section 11, an assignment specifying section 12, a data signal extracting section 13, and a data signal reproducing section 14. The demodulating section 11 is connected to the assignment specifying section 12 and the data signal extracting section 13. The data signal extracting section 13 is connected to the assignment specifying section 12 and the data signal reproducing section 14.

The demodulating section 11 demodulates a reception signal S01 corresponding to the wireless signal S01 received by the mobile station antenna 1a to generate a demodulation signal S02 which is supplied to the assignment specifying section 12 and the data signal extracting section 13. The assignment specifying section 12 specifies a block, in which an ID signal corresponding to an ID assigned to the mobile station 1 itself is superimposed, from the demodulation signal S02 supplied from the demodulating section 11. The assignment specifying section 12 generates the assignment data S03 on the basis of a frequency channel assigned to the specified block and a block number for identifying the specified block. The assignment data S03 is outputted to the data signal extracting section 13. The data signal extracting section 13 extracts a data signal S04 transmitted to the mobile station 1 itself from the demodulation signal S02 on the basis of the block number and the frequency channel contained in the assignment data S03. The extracted data signal S04 is supplied to the data reproducing section 14. The data reproducing section 14 performs symbol determination on the basis of the data signal S04 supplied from the data signal extracting section 13 to generate a data series S05.

Figure 8:
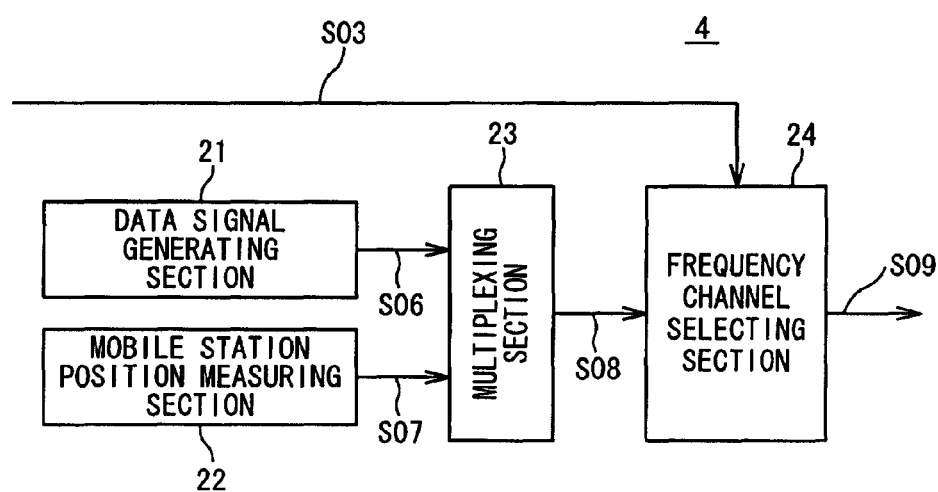
FIG. 8 is a block diagram showing the configuration of a transmitting section in the mobile station according to the first embodiment.

FIG. 8 is a block diagram showing the configuration of the transmitting section 4 in the mobile station 1 according to the first embodiment. As shown in FIG. 8, the transmitting section 4 includes a data signal generating section 21, a mobile station position measuring section 22, a multiplexing section 23, and a frequency channel selecting section 24. The data signal generating section 21 and the position measuring section 22 are connected to the multiplexing section 23. The multiplexing section 23 is further connected to the frequency channel selecting section 24.

The data signal generating section 21 generates a data signal S06 on the basis of a voice or the like inputted from an input device (not shown). The data signal S06 is supplied to the multiplexing section 23 from the data signal generating section 21. The position measuring section 22 has a position measuring device such as a GPS and generates mobile station position data S07 containing position data of the mobile station 1 to supply to the multiplexing section 23. It should be noted that another method may be used to generate the position data. The multiplexing section 23 time-multiplexes the data signal S06 and the mobile station position data S07 to be inputted thereto to generate a multiplexed signal S08. The multiplexed signal S08 is supplied to the frequency channel selecting section 24. The frequency channel selecting section 24 has the assignment data S03 supplied from the receiving section 3. The frequency channel selecting section 24 generates a transmission signal S09 from the multiplexed signal S08 supplied from the multiplexing section 23 on the basis of the assignment data S03. The transmission signal S09 is transmitted toward the base station 2.

Figure 9:
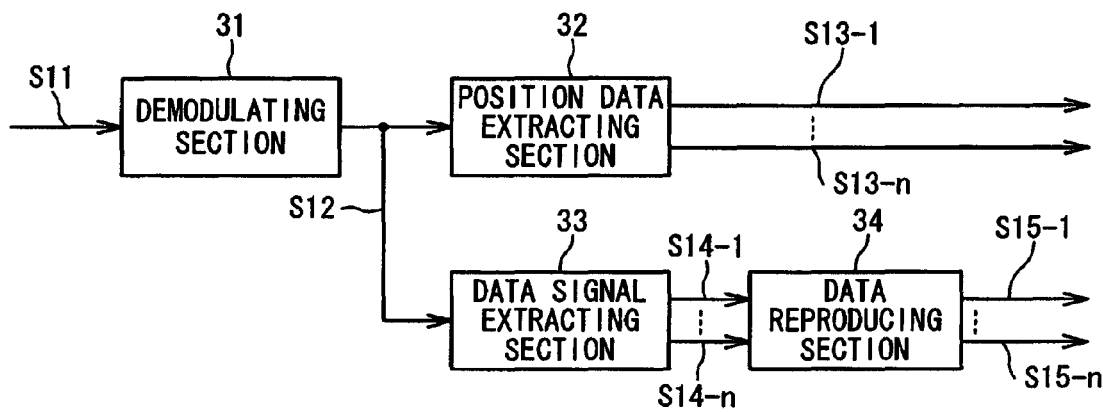
FIG. 9 is a block diagram showing the configuration of a receiving section in a base station according to the first embodiment.

FIG. 9 is a block diagram showing the configuration of the receiving section 5 in the base station 2 according to the first embodiment. As shown in FIG. 9, the receiving section 5 includes a demodulating section 31, a position data extracting section 32, a data signal extracting section 33, and a data reproducing section 34. The demodulating section 31 is connected to the position data extracting section 32 and the data signal extracting section 33. The data signal extracting section 33 is further connected to the data reproducing section 34.

The demodulating section 31 generates a demodulation signal S12 from a reception signal S11 of the uplink frame received by the base station antenna 2a of the base station 2. The position data extracting section 32 extracts position data on each of the plurality of the mobile stations 1 contained in the demodulation signal S12. When the mobile station 1 exists in the area R2 of the cell area B, the mobile station 1 transmits to the base station 2 by using, for example, the second frequency channel. At this time, a signal of the second frequency channel contains mobile station position data and a data signal. The position data extracting section 32 extracts the mobile station position data. Thus, the position data extracting section 32 generates mobile station position data S13-1 to S13-$n$ ($n$ is a natural number of 2 or more) for the plurality of the mobile stations 1, respectively. The data signal extracting section 33 extracts a plurality of data signals (S14-1 to S14-$n$) from the demodulation signal S12 supplied from the demodulating section 31. The data signals S14-1 to S14-$n$ outputted from the data signal extracting section 33 are supplied to the data reproducing section 34. The data reproducing section 34 performs symbol determination to the data signals S14-1 to S14-$n$ to output data series S15-1 to S15-$n$.

Figure 10:
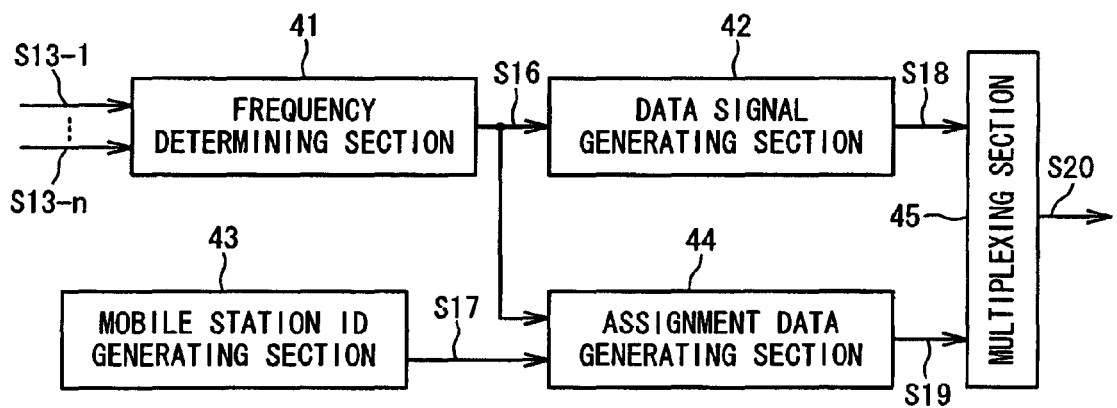
FIG. 10 is a block diagram showing the configuration of a transmitting section in the base station according to the first embodiment.

FIG. 10 is a block diagram showing the configuration of the transmitting section 6 in the first embodiment. As shown in FIG. 10, the transmitting section 6 includes a frequency determining section 41, a data signal generating section 42, a mobile station ID generating section 43, an assignment data generating section 44, and a multiplexing section 45. The frequency determining section 41 is connected to the data signal generating section 42 and the assignment data generating section 44. The mobile station ID generating section 43 is also connected to the assignment data generating section 44, and the data signal generating section 42 and the assignment data generating section 44 are connected to the multiplexing section 45.

The frequency determining section 41 specifies a block used for communication for each of the mobile stations 1 from the position data S13-1 to S13-$n$ of the plurality of the mobile stations 1 to generate block assignment data S16 containing data indicating the specified block. The block assignment data S16 is supplied to the data signal generating section 42 and the assignment data generating section 44. The data signal generating section 42 specifies, for each of the mobile stations, a block used for communication with each of the mobile stations on the basis of the block assignment data S16 outputted from the frequency determining section 41, and generates a data signal in a communicable form by using the specified block to supply to the multiplexing section 45. A mobile station ID is given to each of the mobile stations 1 in advance to identify the mobile station 1. The mobile station IDs are stored in the base station 2, and the mobile station ID generating section 43 generates a mobile station ID data S17 on the basis of the stored data to supply to the assignment data generating section 44. The assignment data generating section 44 specifies a block for communication between each of the mobile stations 1 and the base station 2 on the basis of the block assignment data S16 supplied from the frequency determining section 41. Moreover, on the basis of the mobile station ID data S17, an ID signal S19 is generated by assigning an ID to a frequency channel assigned to the block, and supplied to the multiplexing section 45. The multiplexing section 45 multiplexes the data signal S18 supplied from the data signal generating section 42 and the ID signal S19 supplied from the mobile station ID generating section 43 to generate a transmission signal S20. The transmission signal S20 is therefore transmitted toward the mobile station 1.

Figure 11:
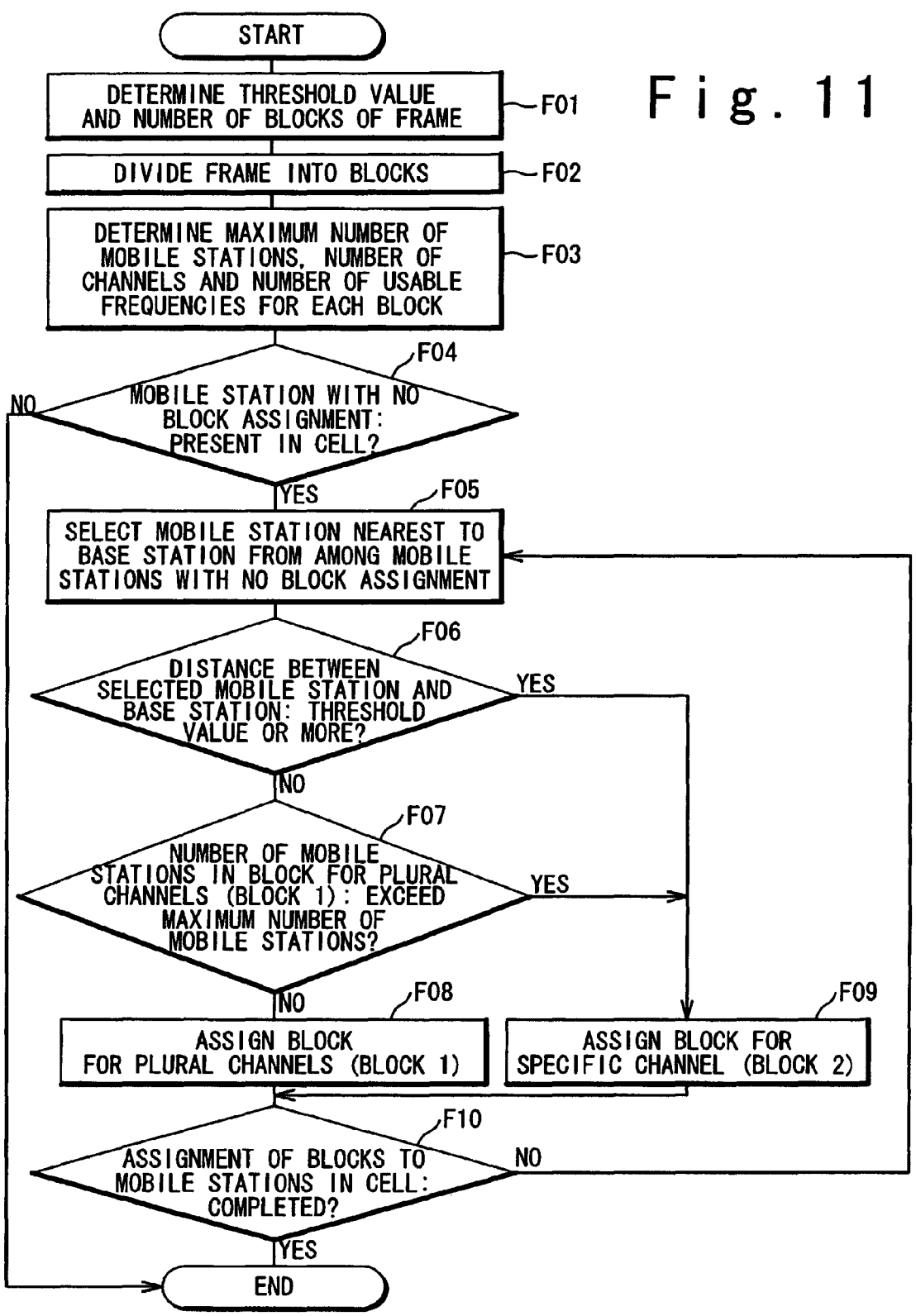
FIG. 11 is a flowchart showing an operation of the wireless transmission system according to the first embodiment.

FIG. 11 is a flowchart showing an operation of the wireless transmission system according to the first embodiment. In the following description, it is assumed that the base station 2 performs communication by using the second frequency channel for the area R2 while performing communication by using the first frequency channel to the third frequency channel for the area R4.

In step F01, the base station 2 determines the number of blocks of a frame. Also, a threshold value is determined which is used to determine a block to be used in accordance with the state of the mobile station 1. In the following description, an example in which the threshold value is related to the distance between the mobile station 1 and the base station 2 will be described. The threshold value is not limited to a physical distance between the mobile station 1 and the base station 2. As a threshold value to express a communication quality distance, for example, an SIR as a ratio of signal power from the mobile station 1 to interference power from other cells can also be used.

In step F02, the base station 2 divides the frame into blocks on the basis of the determined number of blocks. Here, it is assumed that the base station 2 divides the frame into two blocks of a first block and a second block. In step F03, the base station 2 determines the number of available frequency channels in each of the blocks. Also, the base station 2 determines the maximum number of mobile stations for each of the blocks. Here, it is assumed that the first to third frequency channels are assigned to the first block while the second frequency channel is assigned to the second block.

In step F04, the base station 2 determines whether or not any mobile station 1 to which the block assignment is not performed exists among the mobile stations 1 existing in a cell. If the mobile station 1 without the block assignment exists, a control process moves on to step F05. For example, if a mobile station 1 moves from another cell into its own cell, determination in step F04 is "YES".

In step S05, if there is a plurality of the mobile stations 1 without the block assignment, the mobile station 1 closest to the base station 2 is selected. In step F06, the base station 2 performs determination on the basis of position data and a threshold value contained in a reception signal from the selected mobiles station 1. If the position data exceeds the threshold value as a result of the determination, the base station 2 determines that the mobile station 1 is positioned in the area R2 and performs the block assignment to the mobile station 1 so as to use the second block for communication (Step F09). In case of not exceeding the threshold value as a result of the determination, the base station 2 determines that the mobile station 1 is positioned in the area R4 and performs a process of step F07.

In step F07, the base station 2 confirms the number of the mobile stations 1 assigned with the first block in the cell at a current time. The base station 2 checks whether or not a total number of the mobile stations 1 assigned with the first block exceeds the maximum number of the mobile stations on the basis of the confirmation result. In case of exceeding the maximum number of the mobile stations as a result of the determination, the base station 2 assigns the second block to a part of the mobile stations 1 in the area R4 (step F09). In case of not exceeding the maximum number of the mobile stations as a result of the determination, the base station 2 assigns the first block to the mobile stations 1 in the area R4.

In step F10, the base station 2 determines whether or not the block assignment has been completed for all of the mobile stations 1 in the cell. If the mobile station 1 in which the block assignment is not completed exists in the cell, processing returns to step F05 so that block assignment processing is executed. If the block assignment is completed for the mobile stations 1 in the cell, the operation is finished.

As described above, in the wireless transmission system according to the first embodiment, a frequency channel can be assigned on the basis of a position of the mobile station 1 in the cell area B so as to attain a high throughput. Therefore, frequency utilization efficiency can be improved in the wireless transmission system according to the first embodiment.

In the above, the description has been given on the assumption that a change of the block number and the frequency channel is not caused between the uplink and the downlink during communication between the mobile station 1 and the base station 2, which means the mobile station 1 stays in the area. However, if the block number and the frequent channel are changed between the uplink and the downlink, the base station 2 notifies the mobile station 1 of the block number and the frequency channel used for the uplink by using the downlink. Therefore, the mobile station 1 can change the block number and the frequency channel between the uplink and the downlink.

Also, it is possible in the above description to provide the configuration that the block number and the frequency channel assigned to the mobile station 1 are notified to the mobile station 1 in advance. For example, in the wireless transmission system, a control frequency channel is provided so that the base station 2 uses the control frequency channel to notify a block number and a frequency channel assigned to the mobile station 1. Thereafter, the configuration can be made to establish communication between the mobile station 1 and the base station 2. Therefore, the mobile station 1 can specify a block number and a frequency channel assigned without investigating all of the blocks contained in the downlink flame outputted from the base station 2.

Second Embodiment

Next, a wireless transmission system according to the second embodiment of the present invention will be described. In the second embodiment, communication between the mobile station 1 and the base station 2 is carried out by using an OFDM (orthogonal frequency division multiplexing).

Figure 12:
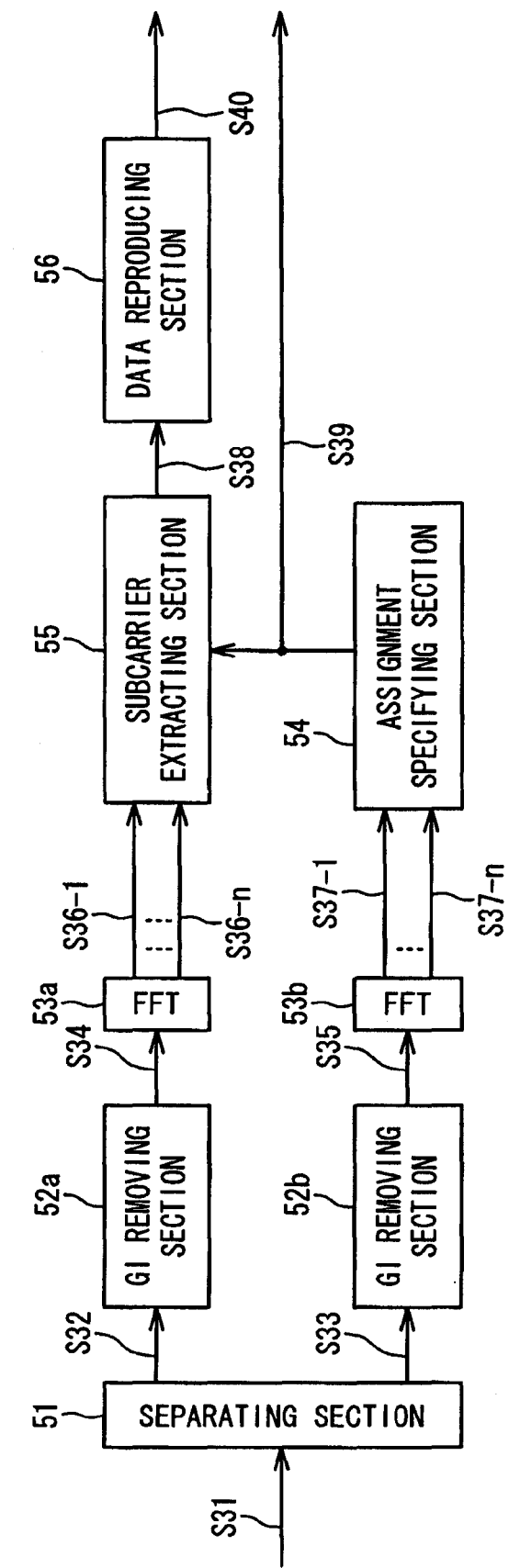
FIG. 12 is a block diagram showing the configuration of the receiving section in the mobile station side according to a second embodiment of the present invention.

FIG. 12 is a block diagram showing the configuration of the receiving section 3 in the mobile station 1 according to the second embodiment of the present invention. As shown in FIG. 12, the receiving section 3 includes a separating section 51, a first GI (guard interval) removing section 52*a*, a second GI removing section 52*b*, a first FFT section 53*a*, a second FFT section 53*b*, an assignment specifying section 54, a subcarrier extracting section 55, and a data reproducing section 56. The separating section 51 is connected to the first GI removing section 52*a* and the second GI removing section 52*b*. The first GI removing section 52*a* is connected to the first FFT section 53*a*, and the second GI removing section 52*b* is similarly connected to the second IFFT section 53*b*. The first FFT section 53*a* is connected to the subcarrier extracting section 55, and the second FFT section 53*b* is connected to the assignment specifying section 54. The assignment specifying section 54 is further connected to the subcarrier extracting section 55, and the subcarrier extracting section 55 is connected to the data reproducing section 56.

The separating section 51 separates a reception signal S31 received by an antenna into a data signal and an ID signal in the frame. The separating section 51 supplies a reception data signal S32 to the first GI removing section 52*a* on the basis of the separated data signal. Similarly, the separating section 51 supplies a reception ID signal S33 to the second GI removing section 52*b* on the basis of the separated ID signal. The first GI removing section 52*a* performs a GI (guard interval) removing process to the reception data signal S32 supplied from the separating section 51, and supplies a GI removed data signal S34 to the first FFT section 53*a*. Similarly, the second GI removing section 52*b* performs a GI removing process to the reception ID signal S33, and supplies a GI removed ID signal S35 to the second FFT section 53*b*. The first FFT section 53*a* performs a fast Fourier transformation to the GI removed data signal S34 to generate an FFT output data signal S36. Similarly, the second FFT section 53*b* performs a fast Fourier transformation to the GI removed ID signal S35 to generate an FFT output ID signal S37. FFT output data signals S36-1 to S36-*n* shown in FIG. 12 indicate the FFT output data signal S36 corresponding to the plurality of the mobile stations. Similarly, FFT output ID signals S37-1 to S37-*n* indicate the FFT output ID signal S37 corresponding to the plurality of the mobile stations, respectively. The assignment specifying section 54 extracts an ID signal corresponding to its own ID from the FFT output ID signal S37 supplied from the second FFT section 53*b*. The assignment specifying section 54 also generates assignment data S39 containing a frequency channel and a block number that correspond to the ID signal. The subcarrier extracting section 55 specifies a subcarrier corresponding to the frequency channel indicated by the assignment data S39, extracts a subcarrier assigned to the mobile station 1 in accordance with the subcarrier and the block number, and outputs a reception data S38 on the basis of the subcarrier. The data reproducing section 56 performs a symbol determination to the reception data signal S38 supplied from the subcarrier extracting section 55, and outputs data series S40.

Figure 13:
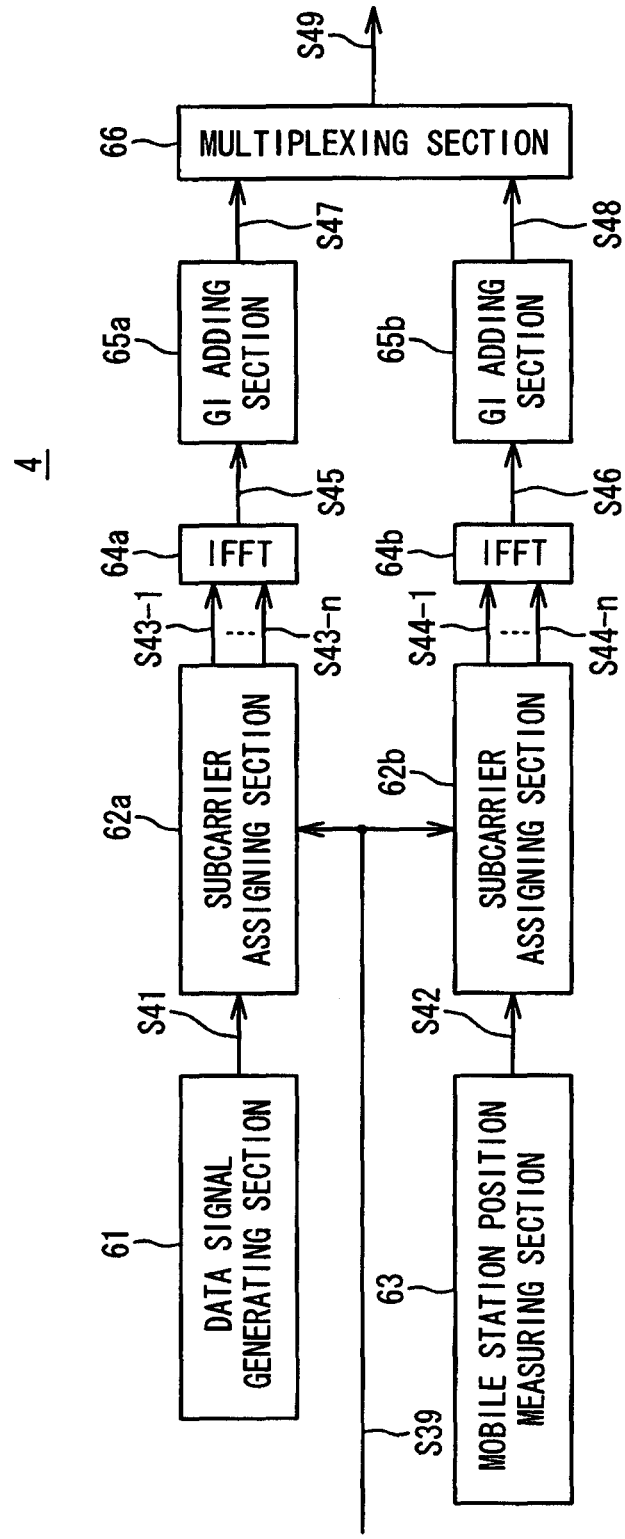
FIG. 13 is a block diagram showing the configuration of the transmitting section in the mobile station side according to the second embodiment.

FIG. 13 is a block diagram showing the configuration of the transmitting section 4 in the mobile station according to the second embodiment of the present invention. As shown in FIG. 13, the transmitting section 4 in the second embodiment includes a data signal generating section 61, a first subcarrier assigning section 62*a*, a second subcarrier assigning section 62*b*, a mobile station position measuring section 63, a first IFFT section 64*a*, a second IFFT section 64*b*, a first GI adding section 65*a*, a second GI adding section 65*b*, and a multiplexing section 66. The data signal generating section 61 and the first subcarrier assigning section 62*a* are connected from each other. Similarly, the mobile station position measuring section 63 and the second subcarrier assigning section 62*b* are connected from each other. The first subcarrier assigning section 62*a* is further connected to the first GI adding section 65*a* via the first IFFT section 64*a*, while the second subcarrier assigning section 62*b* is connected to the second GI adding section 65*b* via the second IFFT section 64*b*. The first GI adding section 65*a* and the second GI adding section 65*b* are connected to the multiplexing section 66.

Figure 14:
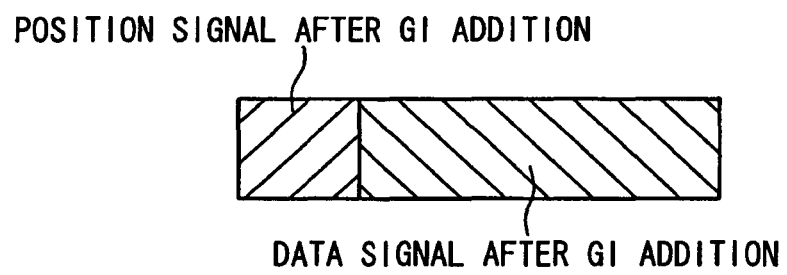
FIG. 14 is a diagram showing the configuration of data to which a guard interval has been added in the second embodiment.

The data signal generating section 61 generates a data signal S41 on the basis of a voice or the like inputted from an input device (not shown). The data signal S41 generated by the data signal generating section 61 is supplied to the first subcarrier assigning section 62*a* from the data signal generating section 61. The mobile station position measuring section 63 is composed of a position measuring device such as a GPS to measure a position of the mobile station 1 in the second embodiment. The mobile station position measuring section 63 supplies mobile station position data S42 containing position data of the mobile station 1 to the second subcarrier assigning section 62*b*. The first subcarrier assigning section 62*a* specifies a subcarrier signal from the data signal S41 outputted from the data signal generating section 61 on the basis of data (frequency channel and block number) indicated by the assignment data S39. The first subcarrier assigning section 62*a* generates an IFFT input data signal S43 by mapping the data signal S41 to the specified subcarrier signal. The second subcarrier assigning section 62*b* specifies a subcarrier from the mobile station position data S42 outputted from the mobile station position measuring section 63 on the basis of the data (frequency channel and block number) indicated by the assignment data S39. The second subcarrier assigning section 62*b* generates an IFFT input position signal S44 by mapping the mobile station position data S42 to the specified subcarrier signal. IFFT input data signals S43-1 to S43-*n* shown in FIG. 13 indicate the IFFT input data signal S43 corresponding to the plurality of the mobile stations. Similarly, IFFT input position signals S44-1 to S44-*n* indicate the FFT input position signal S44 for the plurality of the mobile stations. The first IFFT section 64*a* performs an inverse fast Fourier transformation to the IFFT input data signal S43 to generate an IFFT output data signal S45. Similarly, the second IFFT section 64*b* performs an inverse fast Fourier transformation to the inputted IFFT input position signal S44, to generate an IFFT output position signal S46. The first GI adding section 65*a* adds a GI to the IFFT output data signal S45 supplied from the first IFFT section 64*a* to generate a GI added data signal S47, and supplies the GI added data signal S47 to the multiplexing section 66. The second GI adding section 65*b* adds a GI to the FFT output position signal S46 supplied from the second IFFT section 64*b* to generate a GI added position signal S48. The second GI adding section 65*b* supplies the GI added position signal S48 to the multiplexing section 66. A signal shown in FIG. 14 is thus obtained. The multiplexing section 66 is supplied with the GI added data signal S47 and the GI added position signal S48. The multiplexing section 66 time-multiplexes these signals to output as a transmission signal S49. The multiplexing section 66 outputs the transmission signal S49 at timing of an uplink after a downlink in which data is received by the mobile station 1.

FIG. 15 is a block diagram showing the configuration of the receiving section 5 in the base station according to the second embodiment of the present invention. As shown in FIG. 15, the receiving section 5 in the second embodiment includes a separating section 71, a first GI removing section 72*a*, a second GI removing section 72*b*, a first FFT section 73*a*, a second FFT section 73*b*, a subcarrier assigning section 74, a position data extracting section 75, and a data reproducing section 76. The separating section 71 is connected to the first GI removing section 72*a* and the second GI removing section 72*b*. The first GI removing section 72*a* is connected to the subcarrier assigning section 74 via the first FFT section 73*a*, and the subcarrier assigning section 74 is connected to the data reproducing section 76. The second GI removing section 72*b* is also connected to the position data extracting section 75 via the second FFT section 73*b*.

The base station 2 in the second embodiment receives a reception signal S50 via the base station antenna 2*a* provided for the base station 2. The reception signal S50 is supplied to the separating section 71. The separating section 71 separates the reception signal S50 into a data signal constituting a frame and the mobile station position data. The separating section 71 generates a data signal S51 on the basis of the separated data signal, and generates mobile station position data S52 on the basis of the separated mobile station position data. The first GI removing section 72*a* performs a GI removing process to the data signal S51 supplied from the separating section 71 to supply to the first FFT section 73*a* as a GI removed data signal S54. Similarly, the second GI removing section 72*b* performs a GI removing process to the mobile station position data S52 supplied from the separating section 71 to supply to the second FFT section 73*b* as a GI removed position data S53. The first FFT section 73*a* performs a fast Fourier transformation to the GI removed data signal S54 to generate an FFT data signal S55. Similarly, the second FFT section 73*b* performs a fast Fourier transformation to the GI removed position signal S53 to generate an FFT position signal S56. FFT data signals S55-1 to S55-*n* shown in FIG. 15 indicate the FFT data signal S55 corresponding to the plurality of the mobile stations. Similarly, FFT position signals S55-1 to S55-*n* indicate the FFT position signal S56 corresponding to the plurality of the mobile stations. The position data extracting section 75 extracts data on positions of the plurality of the mobile stations on the basis of the FFT position signal S56, and generates mobile station position data S60 from the extracted data. Block assignment data S59 is assignment data used for assigning a frequency channel and a block number in the downlink before one RTT (round trip time). The subcarrier assigning section 74 extracts a subcarrier corresponding to the frequency channel and the block number contained in the block assignment data S59. The subcarrier assigning section 74 generates a reception data signal S57 on the basis of the extracted subcarrier. The data reproducing section 76 performs symbol determination to the reception data signal S57 supplied from the subcarrier assigning section 74 to output data series S58.

FIG. 16 is a block diagram showing the configuration of the transmitting section 6 in the base station according to the second embodiment of the present invention. As shown in FIG. 16, the transmitting section 6 in the second embodiment includes a frequency determining section 80, a data signal generating section 81, a mobile station ID generating section 82, a first subcarrier assigning section 83*a*, a second subcarrier assigning section 83b, a first IFFT section 84a, a second IFFT section 84b, a first GI adding section 85a, a second GI adding section 85b, and a multiplexing section 86. The frequency determining section 80 is connected to the first subcarrier assigning section 83a and the second subcarrier assigning section 83b. The first subcarrier assigning section 83a is connected to the data signal generating section 81, while the second subcarrier assigning section 83b is connected to the mobile station ID generating section 82. The first subcarrier assigning section 83a is further connected to the first GI adding section 85a via the first IFFT section 84a. Similarly, the second subcarrier assigning section 83b is connected to the second GI adding section 85b via the second IFFT section 84b. Then, the first GI adding section 85a and the second GI adding section 85b are connected to the multiplexing section 86.

The frequency determining section 80 generates block assignment data S70 in response to the mobile station position data S60. The frequency determining section 80 supplies the generated block assignment data S70 to the first subcarrier assigning section 83a and the second subcarrier assigning section 83b. The data signal generating section 81 generates a data signal S61 for transmitting to the mobile station 1. The data signal S61 is supplied to the first subcarrier assigning section 83a. A mobile ID is given to the mobile station 1 in advance for individual identification. The mobile station ID generating section 82 generates an ID signal to identify each of the plurality of the mobile stations 1. The mobile station ID is stored in the base station 2, and the mobile station ID generating section 82 generates mobile station ID data S65 on the basis of the stored data to supply to the second subcarrier assigning section 83b. The first subcarrier assigning section 83a specifies a subcarrier corresponding to the data signal S61 supplied from the data signal generating section 81 on the basis of a frequency channel and a block number contained in the block assignment data S70 outputted from the frequency determining section 80. The first subcarrier assigning section 83a generates an IFFT input data signal S62 by mapping the data signal to the specified subcarrier to supply to the first IFFT section 84a. The second subcarrier assigning section 83b specifies a subcarrier corresponding to the mobile station ID data S65 supplied from the mobile station ID generating section 82 on the basis of the frequency channel and the block number contained in the block assignment ID S70 outputted from the frequency determining section 80. The second subcarrier assigning section 83b generates an IFFT input ID signal S66 by mapping the data signal on the basis of the specified subcarrier to supply to the second IFFT section 84b. IFFT input data signals S62-1 to S62-n shown in FIG. 16 indicate the IFFT input data signal S62 corresponding to the plurality of the mobile stations. Similarly, IFFT input ID signals S66-1 to S66-n indicate the IFFT input ID signal S66 corresponding to the plurality of the mobile stations. The first IFFT section 84a performs an inverse fast Fourier transformation to the IFFT input data signal S62 to generate an IFFT output data signal S63. Similarly, the second IFFT section 84b performs an inverse fast Fourier transformation to the IFFT input ID signal S66 to generate an IFFT output ID signal S67. The first GI adding section 85a adds a GI (guard interval) to the IFFT output data signal S63 supplied from the first IFFT section 84a to generate a GI added data signal S64, and supplies the GI added data signal S64 to the multiplexing section 86. The second GI adding section 85b adds a GI to the IFFT output ID signal S67 supplied from the second IFFT section 84b to generate a GI added ID signal S68. The second GI adding section 85b supplies the GI added ID signal S68 to the multiplexing section 66. The multiplexing section 86 is supplied with the GI added data signal S64 and the GI added ID signal S68. The multiplexing section 86 time-multiplexes these signals to output as a transmission signal S69. The multiplexing section 66 outputs the transmission signal S69 at timing of the downlink following to the uplink in which data is received by the base station 2.

Figure 17A:
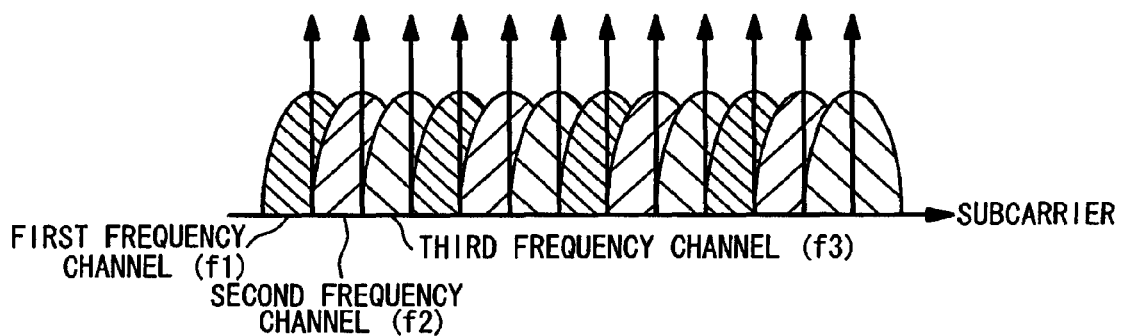
FIG. 17A is a diagram showing an example of subcarrier mapping.
Figure 17B:
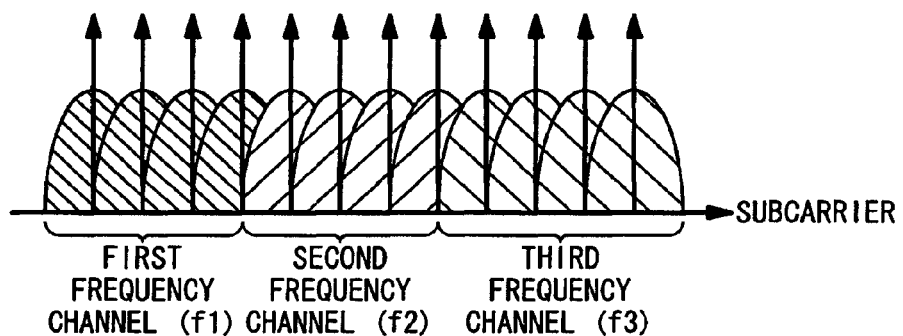
FIG. 17B is a diagram showing another example of the subcarrier mapping.
Figure 17C:
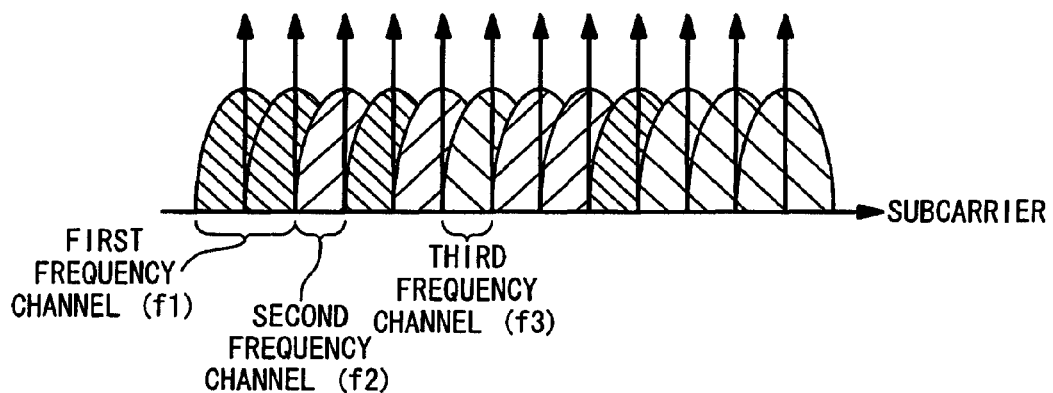
FIG. 17C is a diagram showing yet another example of the subcarrier mapping.

The configuration of a subcarrier in the second embodiment will be described below. FIGS. 17A to 17C are schematic diagrams schematically showing the configuration of subcarrier mapping in the second embodiment. Each of FIGS. 17A to 17C shows the state of performing the subcarrier mapping in a different form. FIG. 17A shows the configuration of the subcarrier in case of mapping each of frequency channels in order in accordance with the elapse of time. FIG. 17B shows the configuration of the subcarrier in case of continuously mapping a single frequency channel to a predetermined number of carriers. FIG. 17C shows the configuration of the subcarrier in case of performing mapping which is different from those of FIGS. 17A and 17B. It is also possible to perform subcarrier mapping other than those described above.

A subcarrier to be used may also be determined as follows. For example, if W is the number of frequency repetition and T is an integer divisible by W, (T/W) subcarriers are in the (y+W*z)-th (Z=0, 1, . . . , T/W) positions among the total T of subcarriers in one OFDM symbol. At this time, the y-th (y=0, 1, . . . , W−1) frequencies channel used in the specific block are composed of the (T/W) subcarriers. Also, the (T/W) subcarriers may be consecutive T/W subcarriers from the (T/W*y+1)-th subcarrier to the (T/W*(y+1))-th subcarrier among the total T of subcarriers in one OFDM symbol. Instead, the (T/W) subcarriers may be T/W subcarriers randomly selected from among the total T of subcarriers in one OFDM symbol on the condition that overlapping with subcarriers used by other frequency channels is q (q=0, 1, . . . , T/W) or less.

Figure 18:
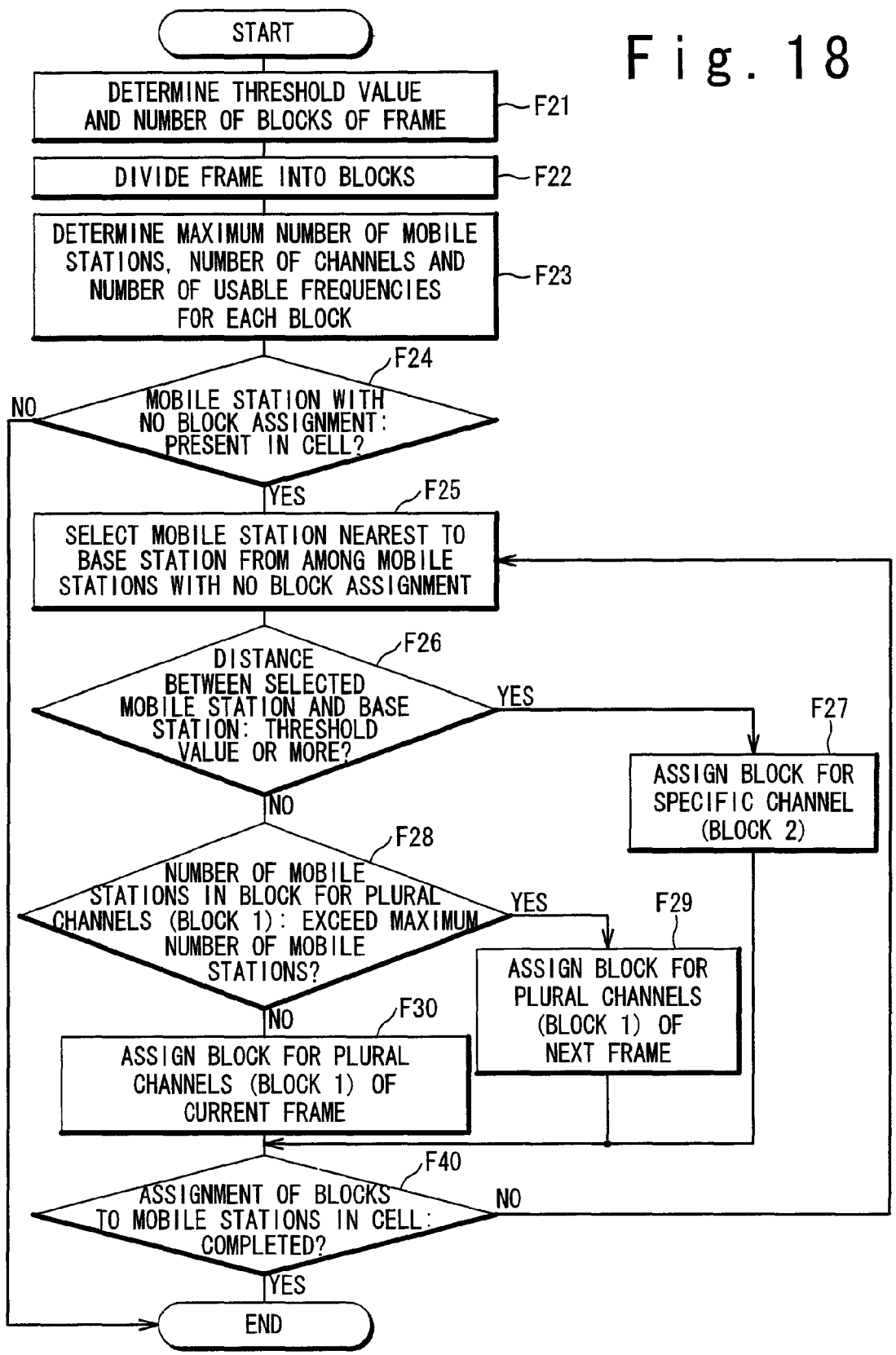
FIG. 18 is a flowchart showing an operation of the wireless transmission system according to the second embodiment.

FIG. 18 is a flowchart showing an operation according to the second embodiment. For easy understanding the operation according to the present invention, it is assumed that the base station 2 performs communication by using the second frequency channel for the area R2 and by using the first frequency channel to the third frequency channel for the area R4. FIG. 18 shows the operation in case of dividing a frame into two blocks in communication between the mobile station 1 and the base station 2.

In step F21, the base station 2 determines the number of blocks of the n-th (n is an arbitrary natural number) frame to be divided, and also determines a threshold value to determine one of the blocks to be used for communication in accordance with the state of the mobile station 1. In the following description, an example in which the threshold value is a physical distance between the mobile station 1 and the base station 2 will be described. However, the threshold value is not limited to the distance between the mobile station 1 and the base station 2. For example, an SIR as a ratio of signal power from the mobile station 1 and interference power from other cells can be used as a communication quality distance.

In step F22, the base station 2 divides a frame on the basis of the determined number of blocks. Here, it is assumed that the base station 2 divides the frame into two blocks of a first block and a second block. In step F23, the base station 2 determines an available frequency channel(s) for each of the blocks. Also, the base station 2 determines the maximum number of the mobile stations for each of the blocks. Here, it is assumed that the first to the third frequency channels are assigned to the first block while the second frequency channel is assigned to the second block.

In step F24, the base station 2 checks whether or not any mobile station 1 without the block assignment exists among the mobile stations 1 existing in the cell. If the mobile station 1 without the block assignment exists, a control flow moves on to step F25. For example, if a single mobile station 1 moves into its own cell from another cell, determination in step F24 is "YES".

In step F25, if there is a plurality of the mobile stations 1 without the block assignment, the mobile station 1 closest to the base station 2 is selected.

In step F26, the base station 2 determines whether or not position data contained in a reception signal from the selected mobile station 1 exceeds a threshold value. In case of exceeding the threshold value as a result of the determination, the base station 2 determines that the mobile station 1 is positioned in the area R1, and performs the block assignment to communicate with the mobile station 1 by using the second block (step F27). In case of not exceeding the threshold value as a result of the determination, the base station 2 determines that the mobile station 1 is positioned in the area R4, and performs a process of step F28.

In step F28, the base station 2 confirms the number of the mobile stations 1 assigned with the first block in a cell at a current time. The base station 2 determines whether or not the total number of the mobile stations 1 assigned with the first block exceeds the maximum number of the mobile stations on the basis of the confirmation. In case of exceeding the maximum number of the mobile stations as a result of the determination, the base station 2 assigns the first block of the (n+1)-th frame to this mobile station 1 positioned in the area R4 (step F29). In case of not exceeding the maximum number of the mobile station as a result of the determination, the base station 2 assigns the first block of the n-th frame to the mobile station 1 (step F30).

In step F40, the base station 2 determines whether or not the block assignment has been completed for all of the mobile stations 1 in the cell. As a result of the determination, if the mobile station 1 without the block assignment exists in the cell, the control flow returns to step F25 to perform the block assignment process. If the block assignment process to the mobile stations 1 in the cell has been completed, the operation is ended.

It should be noted that the determination is done by setting a threshold value in the above example. However, a table may be prepared in advance and referred for the determination.

As described above, in the wireless transmission system according to the second embodiment, a frequency channel can be assigned on the basis of the position of the mobile stations 1 in the cell to attain a high throughput. Accordingly, a frequency utilization efficiency can be improved. Also, it is possible to perform the first embodiment and the second embodiment in combination within a range with no contradiction.

According to the present invention, in a wireless transmission system in a cellular configuration of a base station and a mobile station, a wireless transmission system can be constructed to prevent interference between cells and achieve the high frequency utilization efficiency.

As described above, according to the present invention, an effect of realizing a high system throughput can be obtained by changing the number of frequency repetition in accordance with the distance between a base station and a mobile station, compared with a case of using the same frequency repetition for entire mobile stations.

The invention claimed is:
1. A base station comprising:
a determining unit configured to determine whether: a mobile station is close to the base station; or the mobile station is close to an edge of a coverage of the base station; and
a transmitter configured to transmit: a signal to the mobile station using a first time slot where all frequency channels are available, in a case where the mobile station is close to the base station; or the signal to the mobile station using a second time slot where a fraction of the all frequency channels is available, in a case where the mobile station is close to the edge of the coverage of the base station.
2. The base station in accordance with claim 1, wherein the fraction used by the base station is different from a fraction of the all frequency channels used by a neighboring base station.
3. A mobile station comprising:
a receiver configured to receive: a signal from a base station using a first time slot where all frequency channels are available, in a case where the mobile station is determined by the base station to be close to the base station; or the signal from the base station using a second time slot where a fraction of the all frequency channels is available, in a case where the mobile station is determined by the base station to be close to the edge of the coverage of the base station.
4. The mobile station in accordance with claim 3, wherein the fraction used by the base station is different from a fraction used by a neighboring base station.

* * * * *